(12) United States Patent
Schwesig et al.

(10) Patent No.: US 8,508,487 B2
(45) Date of Patent: Aug. 13, 2013

(54) INFORMATION PROCESSING APPARATUS, INFORMATION PROCESSING METHOD, AND COMPUTER PROGRAM

(75) Inventors: Carsten Schwesig, Tokyo (JP); Tobias Daniel Rydenhag, Tokyo (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 12/135,018

(22) Filed: Jun. 6, 2008

(65) Prior Publication Data

US 2008/0303799 A1 Dec. 11, 2008

(30) Foreign Application Priority Data

Jun. 7, 2007 (JP) ................................ P2007-151840

(51) Int. Cl.
*G06F 3/041* (2006.01)
(52) U.S. Cl.
USPC .......................................................... 345/173
(58) Field of Classification Search
USPC ................................................. 345/175, 173
See application file for complete search history.

(56) References Cited

U.S. PATENT DOCUMENTS

| | | | |
|---|---|---|---|
| 2004/0108995 A1* | 6/2004 | Hoshino et al. | 345/173 |
| 2006/0022955 A1* | 2/2006 | Kennedy | 345/173 |
| 2006/0279548 A1* | 12/2006 | Geaghan | 345/173 |

FOREIGN PATENT DOCUMENTS

| | | |
|---|---|---|
| JP | 5-346923 | 12/1993 |
| JP | 10-154042 | 6/1998 |
| JP | 2003-223265 | 8/2003 |
| JP | 2004-302958 | 10/2004 |
| JP | 2005-018669 | 1/2005 |
| JP | 2005-038812 | 2/2005 |
| JP | 2006-59238 | 3/2006 |
| JP | 2006-235426 | 9/2006 |

* cited by examiner

*Primary Examiner* — Quan-Zhen Wang
*Assistant Examiner* — Nelson D Runkle, III
(74) *Attorney, Agent, or Firm* — Finnegan, Henderson, Farabow, Garrett & Dunner, L.L.P.

(57) ABSTRACT

An information processing apparatus including an operation input unit including an operation surface having virtual buttons variably set thereto is disclosed. The apparatus includes a position detection unit detecting whether a user touches the operation surface of the operation input unit, and a position at which the user touches the operation surface thereof, and a pressure detection unit detecting pressure applied by the user touching the operation surface thereof. The apparatus further includes a virtual button control unit interpreting, when the position detection unit has detected the position at which the user touches the operation surface thereof, a virtual button corresponding to the detected position as a selected virtual button, and correcting, when the pressure detected is equal to or greater than a first threshold value, a layout of the virtual buttons such that a size of the selected virtual button is enlarged according to intensity of the detected pressure.

10 Claims, 14 Drawing Sheets

INFORMATION PROCESSING APPARATUS, INFORMATION PROCESSING METHOD, AND COMPUTER PROGRAM

CROSS REFERENCES TO RELATED APPLICATIONS

The invention contains subject matter related to Japanese Patent Application JP 2007-151840 filed in the Japanese Patent Office on Jun. 7, 2007, the entire contents of which being incorporated herein by reference.

BACKGROUND OF THE INVENTION

1. Field of the Invention

The invention relates to an information processing apparatus having an input device via which a user inputs data by touching, almost touching, and depressing an operation surface thereof with a finger, an information processing method thereof, and a computer program therefor.

2. Description of the Related Art

Examples of a known input device for inputting data to an information processing apparatus include a personal computer, a keyboard, a mouse, a touch pad, a drawing pad, a touch panel, a joystick, and a track ball.

These input devices have been improved in view of downsizing, facilitating operation thereof, and the like.

For example, Japanese Unexamined Patent Application Publication No. 2005-18669 discloses a touch panel utilizing an electrostatic capacitive touch in which pseudo-pressing is detected according to a change in an electrostatic capacity that varies with the size of a touched area.

In addition, Japanese Unexamined Patent Application Publication No. 2005-38812 discloses, for example, an input device including a depressing force sensor configured to change the input score with a high accuracy based on the magnitude of the pressing force.

Further, Japanese Unexamined Patent Application Publication No. 2003-223265 discloses an input device configured to detect whether a button is touched, almost touched, and depressed, for example.

In such an input device, a button is selected upon the detection of whether a button is touched, almost touched, or depressed. Then, for example, when one of the softbuttons displayed on a screen of a display device connected with the input device is selected, the selected softbutton is highlighted.

Further, a user depresses a button with a finger to apply pressure to execute a function assigned both to the selected button and the softbutton on the screen.

SUMMARY OF THE INVENTION

The input device described in the above-described JP Publication No. 2003-223265 includes a structure where a number of physical buttons are aligned.

In contrast to the input device having such a structure, the input device may also include a structure having, instead of physical buttons, a touch panel, a touch pad, and the like, an operation surface of which is divided by borders invisible to the user, divided regions are utilized as virtual buttons, via which the user can input data.

According to the structure, the virtual buttons individually detect whether the buttons are touched, almost touched, or depressed.

The user can operate, while watching a GUI (Graphical User Interface) on a display screen, the GUI with his/her finger (to touch or depress) on the operation surface of the input device.

However, in the input device using such virtual buttons, a problem may arise when pressure is applied while the finger position is near the border of the currently active virtual button region.

That is, since the contact surface of the finger on the input device increases and moves when pressure is applied, the interpreted finger position can move to an adjacent button area without conscious movement by the user.

Such movement of a finger is described below with reference to FIG. 1A and FIG. 1B.

A touched area S with the finger is relatively small when the user only touches the operation surface of the input device with his/her the finger without applying pressure as illustrated in FIG. 1A.

Therefore, even if the finger touches near the border of a desired virtual button B1 as illustrated in FIG. 1A, the touched area S is still within the region of the desired virtual button B1. A position P ("+" mark in figure) of the finger interpreted based on detection of the position of the touched area S is also within the region of the selected desired virtual button B1, and as indicated by a shaded area in the figure, the button B1 is activated, and a corresponding function is executed.

On the other hand, as the pressure is continuously applied with the finger, the touched area S with the finger increases. Simultaneously, as the user bends his/her fingertip, the center position of the touched area S is moved.

Therefore, if relatively strong pressure is applied with the finger, as illustrated in FIG. 1B, the touched area S crosses over a border L of the region of the desired virtual button B1 to extend to the region of a neighboring button B2, and the center position of the touched area S is also moved to the region of the neighboring button B2. Accordingly, the position P ("+" mark in figure) of the finger interpreted based on detection of the position of the touched area S is also moved from the region of the virtual button B1 to the region of the neighboring button B2, and as indicated by a shaded area in the figure, the neighboring button B is activated, and a corresponding function is executed.

As a result, the user may activate unintended function.

Attempts have been made to provide an information processing apparatus utilizing an input device capable of preventing the activation of functions not intended by the user, an information processing method thereof and a computer program therefor.

According to an embodiment of the invention, an information processing apparatus includes an operation input unit including an operation surface to which virtual buttons are variably set. A position detection unit is configured to detect whether a user touches or almost touches the operation surface of the operation input unit, and to detect a position of the touched or almost touched area in the operation surface of the operation input unit. A pressure detection unit is configured to detect pressure applied by the user touching the operation surface of the operation input unit with a finger. A virtual button control unit is configured to interpret, when the position detection unit has detected the position at which the user touches or almost touches the operation surface of the operation input unit with a finger, a virtual button corresponding to the detected position as a selected virtual button, and to correct, when the pressure detected by the pressure detection unit is equal to or greater than a first threshold value, a layout of the virtual buttons such that a size of the selected virtual button is enlarged according to intensity of the detected pressure.

According to another embodiment of the invention, an information processing method variably setting virtual buttons to an operation surface and operating the virtual buttons is provided. The method includes steps of detecting whether the user touches or almost touches the operation surface of the operation input unit with a finger; detecting a position at which the user touches or almost touches the operation surface of the operation input unit with a finger; detecting pressure applied by the user touching the operation surface of the operation input unit with a finger; and interpreting, when the position at which the user touches or almost touches the operation surface of the operation input unit with a finger in the position detecting step, a virtual button corresponding to the detected position as a selected virtual button, and correcting, when the pressure applied by the user touching the operation surface of the operation input unit with a finger in the pressure detecting step is equal to or greater than a first threshold value, a layout of the virtual buttons such that a size of the selected virtual button is enlarged according to intensity of the detected pressure.

According to still another embodiment of the invention, a computer program for an input device installed on a computer to execute processing is provided. The input device is provided with an operation surface, a position detection unit detecting whether the user touches or almost touches the operation surface of the operation input unit with a finger and detecting a position at which the user touches or almost touches the operation surface of the operation input unit with a finger, and a pressure detection unit detecting pressure applied by the user touching the operation surface of the operation input unit with a finger. The processing includes steps of setting virtual buttons to the operation surface in a predetermined layout; interpreting, when the position detection unit detects position at which the user touches or almost touches the operation surface of the operation input unit with a finger, a virtual button corresponding to the position detected at which the user touches or almost touches the operation surface of the operation input unit with a finger in the position detection unit as a selected virtual button; correcting, when pressure is detected in the pressure detection unit and the detected pressure is equal to or greater than a first threshold value, the layout of the virtual buttons such that a size of the selected virtual button is enlarged according to intensity of the detected pressure; and setting the virtual buttons in the operation surface according to the corrected layout.

In the configuration of the above-described information processing apparatus, the virtual button control unit corrects the layout of the virtual buttons such that the size of the selected virtual button is enlarged according to the intensity of the detected pressure when the detected pressure is equal to or greater than the first threshold value. Therefore, when the detected pressure is equal to or greater than the threshold, the virtual buttons are set to the operation surface with the corrected layout.

Thus, even if the operation surface of the operation input unit is depressed with a finger, or the like, and the touched area is expanded or the position of the touched area is displaced, because the layout of the virtual buttons is set with the size of the selected virtual button enlarged according to the pressure, the touched area can be accommodated in the region of the selected virtual button.

According to the above-described information processing method, the virtual buttons are set to the operation surface in the corrected layout by the interpreting/correcting step to correct, when the pressure detected in the pressure detecting step is equal to or greater than the first threshold value, the layout of the virtual buttons such that the size of the selected virtual button is enlarged according to the intensity of the detected pressure.

Thus, even if the operation surface of the operation input unit is depressed with a finger, or the like, and hence the touched area is expanded or the position of the touched area is displaced, because the layout of the virtual buttons is set with the size of the selected virtual button enlarged according to the pressure, the touched area can be accommodated in the region of the selected virtual button.

According to the above-described computer program, when executed by a computer, the step to correct the layout of the virtual buttons, when the pressure is detected in the pressure detection unit and the detected pressure is equal to or greater than the first threshold value, such that the size of the selected virtual button is enlarged according to the detected pressure, and the step to set the virtual buttons to the operation surface in the corrected layout are executed.

Thus, even if the operation surface of the operation input unit is depressed with a finger, or the like, and hence the touched area is expanded or the position of the touched area is displaced, because the layout of the virtual buttons is set with the size of the selected virtual button enlarged according to the pressure, the touched area can be accommodated in the region of the selected virtual button.

According to the above-described embodiment of the invention, even if the operation surface of the operation input unit is depressed with a finger, and the like and thereby the touched area is expanded or the position of the touched area is displaced, the touched area can be accommodated in the region of the selected virtual button, so that it can be prevented that a neighboring virtual button is selected and hence unintended function is activated by the user.

DESCRIPTION OF THE PREFERRED EMBODIMENTS

Examples of preferred embodiments of the invention will now be described with reference to drawings. The invention is not limited to the examples described below.

Figure 2:
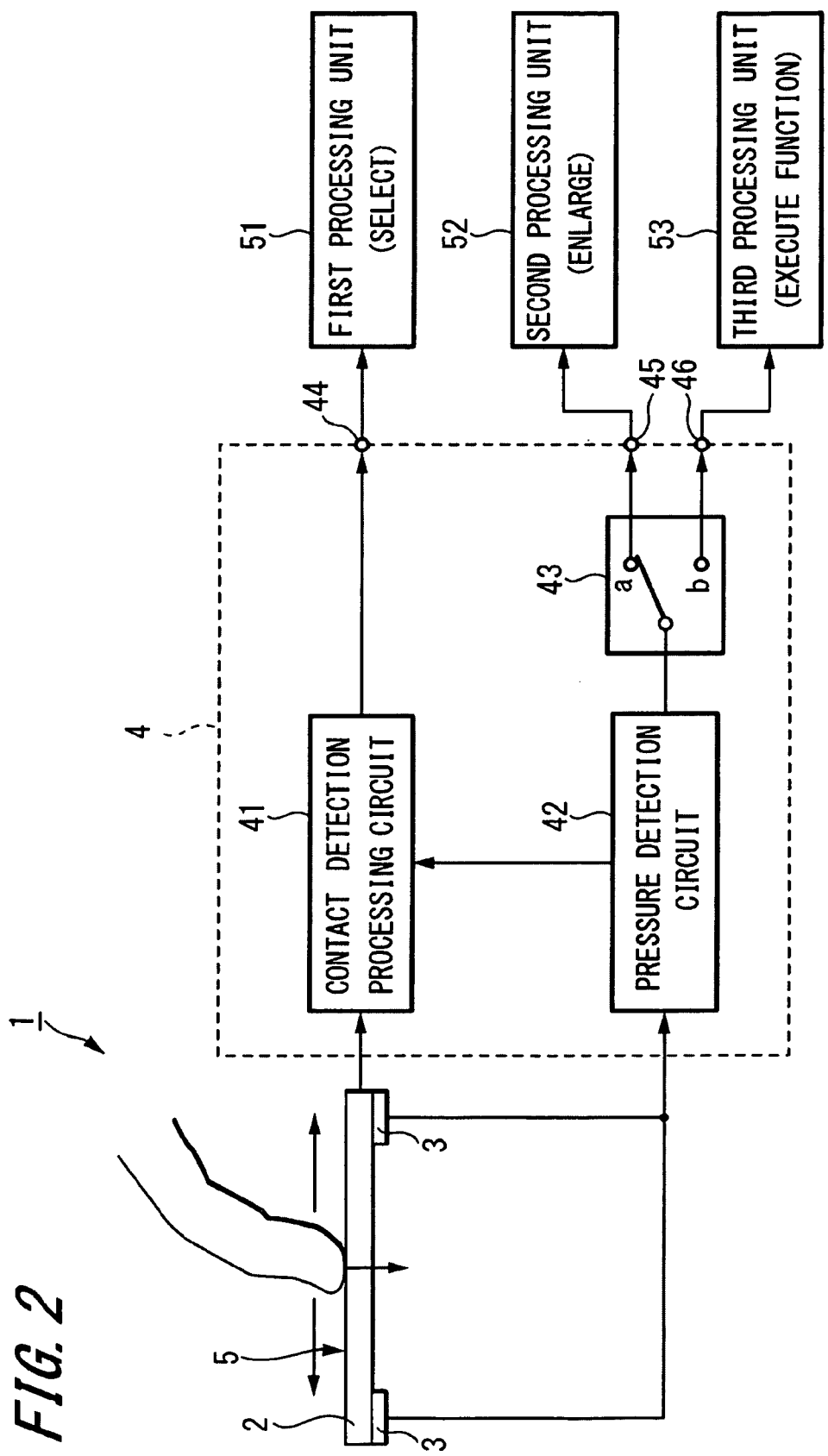
FIG. 2 is a schematic block diagram of an input device utilized for an information processing apparatus according to an embodiment of the invention.

FIG. 2 is a schematic block diagram of an input device utilized in an information processing apparatus according to an embodiment of the invention.

An input device 1 includes a contact sensor unit 2, a pressure sensor unit 3, and a control unit 4 configured to output control signals in response to detection outputs from the contact sensor unit 2 and the pressure sensor unit 3.

The contact sensor unit 2 is a contact detection device configured to detect physical contact on an operation input surface of with a finger (hereinafter referred to as an operation surface) by an electrostatic capacitive touch system, a resistive touch system, and the like, which includes those used as a touch sensor, a touch pad or a touch panel.

In the input device 1 of the embodiment, the contact sensor unit 2 has also a position detection function to detect a contact position of a finger as described later.

The pressure sensor unit 3 is configured, as a pressure detection device detecting pressure applied by the physical contact, to detect pressure when depressed with a finger, and the like, and is also called a pressure-sensitive sensor or a pressure detection device. The pressure sensor unit 3 may be constituted for example using a piezoelectric element, a pressure-resistance conversion element, and the like.

In the input device 1, the surface of the plate-like contact sensor unit 2 serves as an operation surface 5 constituting an operation input unit of the input device 1. The pressure sensor unit 3 is arranged for example in each of four corners of the rear surface of the contact sensor unit 2, and the plate-like contact sensor unit 2 is supported by the pressure sensor unit 3.

With the configuration as described above, if a finger, and the like touches the surface of the contact sensor unit 2, which is the operation surface 5 of the input device 1, and performs a depressing operation, the pressure thereof is applied to the pressure sensor unit 3 through the contact sensor unit 2 and the pressure of the finger is detected by the pressure sensor unit 3.

The control unit 4 includes a contact detection processing circuit 41 connected with the contact sensor unit 2 which carries out detection processing of a contact position of the finger and outputs an electrical contact position information signal, and a pressure detection circuit 42 connected with the pressure sensor unit 3 and which carries out detection processing of the applied pressure (the depressing force by the finger) and outputs an electrical pressure detection signal.

Thus, in this embodiment, the contact sensor unit 2 and the contact detection processing circuit 41 constitute a position detection unit detecting whether the user touches or almost touches the operation surface of the operation input unit of the input device 1 and detecting a position at which the user touches or almost touches the operation surface of the operation input unit of the input device 1. The pressure sensor unit 3 and the pressure detection circuit 42 constitute a pressure detection unit detecting pressure of the contact with the operation surface of the input device 1.

The contact position information signal from the contact detection processing circuit 41 is transmitted to a first processing function unit 51 via an output terminal 44 of the control unit 4.

The pressure detection signal from the pressure detection circuit 42 is transmitted to a switching selection circuit 43 having two terminals "a" and "b". A first signal from the terminal a of the switching selection circuit 43 is transmitted to a second processing function unit 52 via an output terminal 45 of the control unit 4, and a second signal from the terminal b of the switching selection circuit 43 is transmitted to a third processing function unit 53 via an output terminal 46 of the control unit 4.

The first processing function unit 51 carries out, for example as described later, a process of selecting, among from a number of selection objects (icons, softbuttons, etc.), an object, the function of which is to be executed, and highlighting the selected object.

The second processing function unit 52 carries out, as described in detail later, a process of enlarging a virtual button corresponding to the selected object, in response to the pressure detected by the pressure detection circuit 42.

The third processing function unit 53 for example carries out a process of executing the function of a selected object (an icon, a softbutton, etc.).

Thus, in this embodiment, the first processing function unit 51, the second processing function unit 52, and the third processing function unit 53 constitute a virtual button control unit, which interprets, when the position detection unit has detected the position at which the user touches or almost touches the operation surface of the input device 1, a virtual button corresponding to the detected position at which the user touches or almost touches the operation surface of the input device 1, as a selected virtual button, and corrects a layout of virtual buttons such that the size of the selected virtual button is enlarged, as described later.

In the input device 1, virtual buttons are set to the operation surface 5 in a predetermined layout.

That is, the operation surface 5 is divided with borders that are invisible to the user, and virtual buttons are set while treating respective regions divided with the borders as buttons. By touching the operation surface 5 with a finger, a virtual button of the region corresponding to a contact position with the finger of the contact surface 5 is selected, so that inputting can be carried out.

Figure 3A:
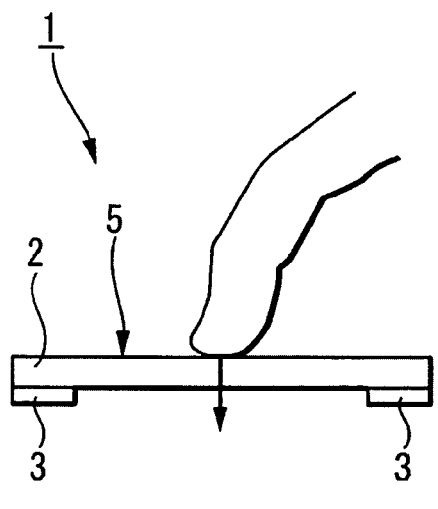
FIG. 3A and FIG. 3B are diagrams for explaining an input operation in the input device.
Figure 3B:
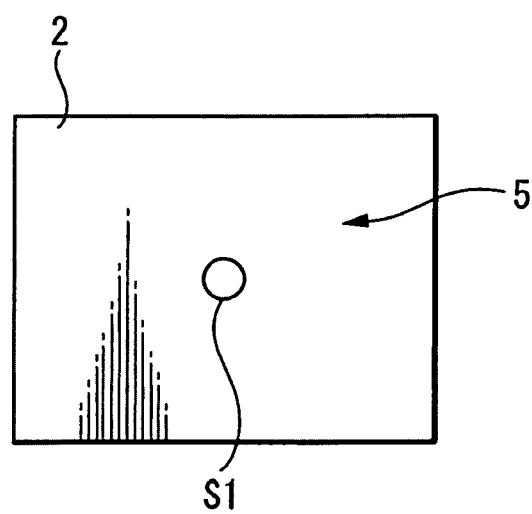
Figure 4:
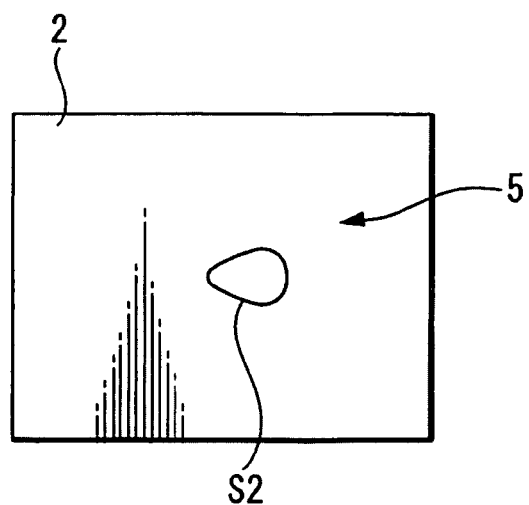
FIG. 4 is another diagram for explaining the input operation in the input device.

Next, an input operation with a finger in the input device 1 is described referring to FIG. 3A, FIG. 3B, and FIG. 4.

FIG. 3A is a schematic cross section and FIG. 3B is a plan view when a finger has been put up and the fingertip has been caused to touch the operation surface 5 (the surface of the contact sensor unit 2) of the input device 1. At this time, as illustrated in FIG. 3B, the touched area of the fingertip with the operation surface 5 of the contact sensor unit 2 is relatively small as indicated by an area S1.

FIG. 4 is a plan view when pressure has been applied with the finger from the state illustrated in FIG. 3A and FIG. 3B and relatively strong pressure is being applied.

If relatively strong pressure is applied, the touched area of the finger with the operation surface 5 of the contact sensor unit 2 becomes relatively large (broad) as indicated by an area S2 in FIG. 4. This is because that from the state that only the fingertip is in contact with the operation surface 5, it comes to a state that a portion of the pad of the finger is also brought into contact with the operation surface 5, and the portion of the finger touching the operation surface 5 is slightly expanded toward the pad of the finger. Thereby, the center position of the touched area with the finger of the operation surface 5 is moved from the center position of the area S1 to the center position of the area S2.

In this embodiment, in particular, setting of virtual buttons to the operation surface 5 of the input device 1 is made variable, and in response to the pressure to the operation surface 5 of the input device 1 from the finger, the size of a corresponding virtual button is changed.

That is, processing is executed such that as the pressure is larger, the virtual button becomes larger and expanded. This processing is executed, in the block diagram of FIG. 2, for example, by the second processing function part 52, based on the pressure detected by the pressure detection circuit 42.

Further, according to the embodiment, in a display device (a display, etc.) connected with the input device 1, a function corresponding to the input operation is selected and displayed, and the displayed function is executed based on the input operation to the input device 1 illustrated in FIG. 2. Here, an integrated information processing apparatus configured to include the input device 1 and a display device, or a system may be configured to include the input device 1 and a display device that are connected such that signals can be transmitted via wired or wireless connection.

Next, a relationship between the operation surface 5 of the input device 1 according to this embodiment and a display screen of a display device will be described by referring to FIG. 5A, FIG. 5B, and FIG. 5C.

Figure 5A:
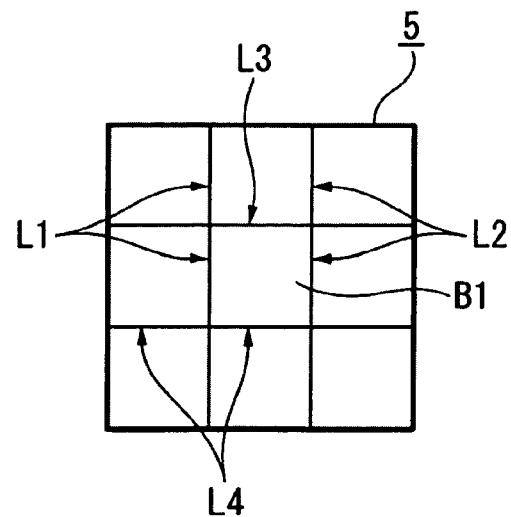
FIG. 5A, FIG. 5B, and FIG. 5C are diagrams for explaining a relationship between virtual buttons of the input device and softbuttons on a display screen of a display device.

FIG. 5A is a schematic plan view of the operation surface 5 of the input device 1 illustrated in FIG. 2.

Figure 1A:
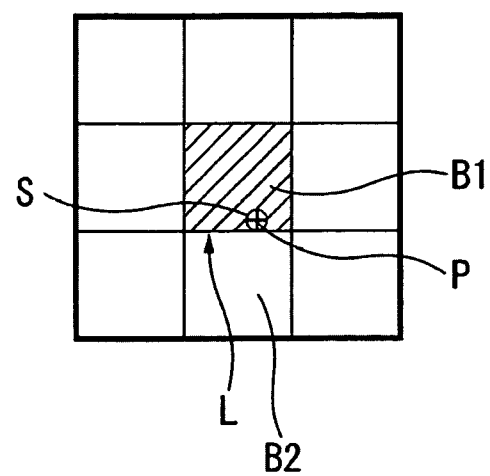
FIG. 1A and FIG. 1B are diagrams for explaining a problem occurring in an input device having virtual buttons when a user applies depressing force with a finger.
Figure 1B:
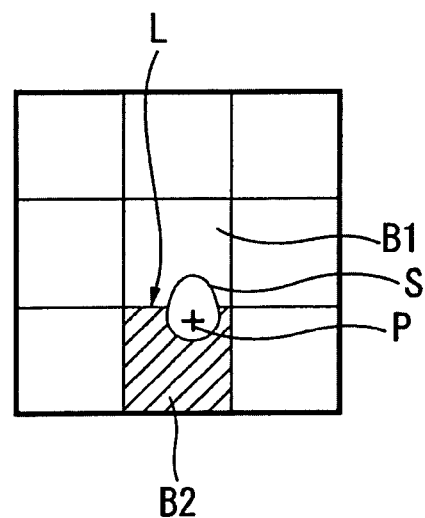
Figure 9:
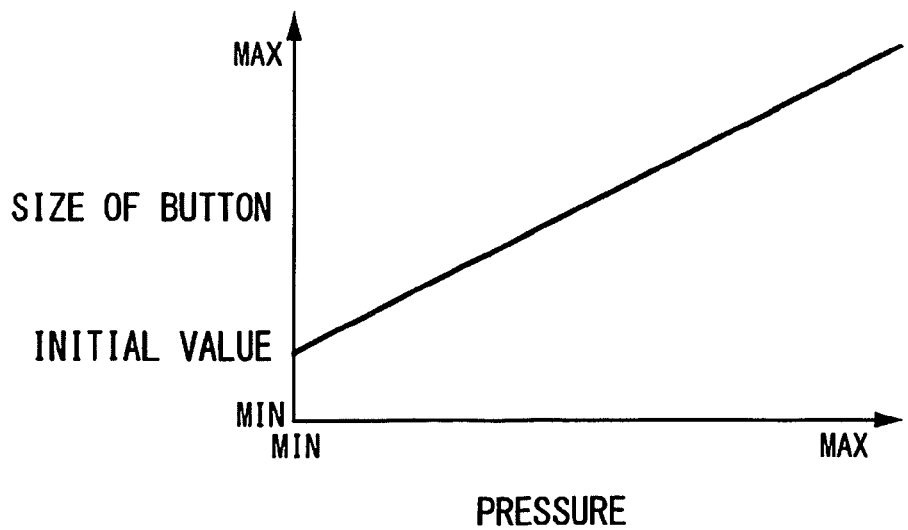
FIG. 9 is another diagram illustrating another mode of changing the size of a virtual button in response to applied pressure.

As illustrated in FIG. 5A, 9 virtual buttons, three in the vertical direction and three in the horizontal direction, are provided in the operation surface 5 (the surface of the contact sensor unit 2) of the input device 1 in the same manner as described with reference to FIG. 1A and FIG. 1B. Respective virtual buttons correspond to regions of the operation surface 5 of the input device 1 divided by borderlines L1, L2, L3, and L4 in the vertical and horizontal directions. Note that generally, these borderlines L1, L2, L3 and L4 are not displayed in the actual operation surface 5.

Figure 5B:
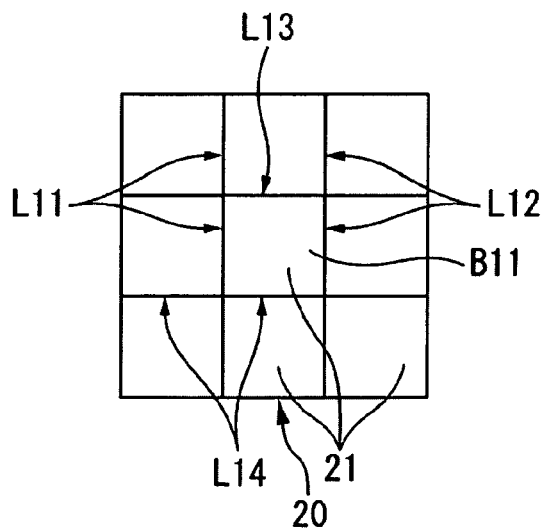

FIG. 5B illustrates virtual button arrangement corresponding to the virtual buttons illustrated in FIG. 5A. A virtual button group 20 including 9 buttons 21 corresponding to the 9 virtual buttons of FIG. 5A is provided. Borderlines L11, L12, L13, and L14 of the buttons 21 of the button group 20 correspond to the borderlines L1, L2, L3, and L4 of the operation surface 5 of the input device 1, respectively.

When expanding a virtual button, of the button group 20 of FIG. 5B, the size of a button 21 corresponding to the virtual button to be expanded is changed. That is, the portions around the corresponding button 21 of the borderlines L11, L12, L13, and L14 are moved. Thus, the arrangement of the buttons 21 of the button group 20 is set, and in conjunction with this, the virtual buttons and the borderlines L1, L2, L3 and L4 of the operation surface 5 of the input device 1 are reset.

Figure 5C:
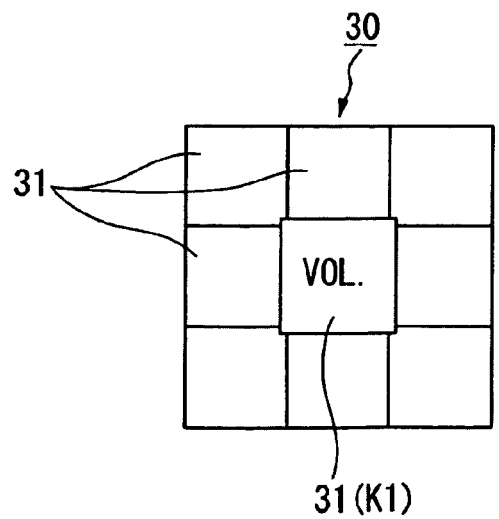

FIG. 5C illustrates an image of function information displayed in the display screen of the display device based on the input operation to the input device 1. The virtual buttons of the operation surface 5 of the input device 1 of FIG. 5A are displayed as softbuttons 31 of a soft keypad 30 on the display screen of FIG. 5C.

In the input device 1 configured as described above, if a finger touches a region in the center of the operation surface 5 of the input device 1, a virtual button B1 in the region in the center (see FIG. 5A) is selected.

At this time, the contact position of the finger with the operation surface 5 is detected by the contact detection processing circuit 41 illustrated in FIG. 2, and based upon the detection result, of the 9 buttons 21 of the button group 20 in FIG. 5B, a button B11 in the center corresponds to the contact position of the finger. The virtual button B1 to be touched with the finger and to be selected can be determined as selected.

Then, as illustrated in FIG. 5C, a softbutton 31 of the soft keypad 30 on the display screen that corresponds to the selected virtual button B1, that is, of the 9 softbuttons 31, a softbutton K1 in the center, has a slightly larger size than the other soft buttons 31 to be highlighted. Note that highlight displaying can be realized, instead of changing the size of a softbutton, by displaying the softbutton inverted, raising the luminance to display the softbutton brighter, or when the display screen displays color, by changing the color of the softbutton.

In FIG. 5C, the softbutton 31 (K1) in the center corresponds to a volume control button, and the function name is displayed in characters as "VOL.". In addition to this, various functions can be assigned to the virtual buttons and the softbuttons.

Note that in FIG. 5C, only the function name (VOL.) of the softbutton 31 (K1) corresponding to the button in contact with the finger is displayed, however, function names, icons expressing functions, and the like may be displayed in other softbuttons 31 not in contact with the finger. By thus displaying functions names, and the like in the softbuttons 31, even without executing respective functions, the user can understand the function that is executed with a corresponding softbutton.

Further, it should be noted that even if the borderlines of the softbuttons illustrated in FIG. 5C are not displayed and only symbols, e.g., icons, and the like, may be displayed on the display screen.

Further, the sizes and shapes and the arrangement of the softbuttons of the display device may not similar to those of the buttons of the input device 1. It would suffice if correspondence between the buttons of the input device 1 and the softbuttons of the display device can be easily understood based on the arrangement and contents of the softbuttons.

Next, referring to FIG. 6, FIG. 7A, FIG. 7B, and FIG. 7C, a change in the size of the virtual button illustrated in FIG. 5A, which is caused in response to pressure, is described.

Figure 6:
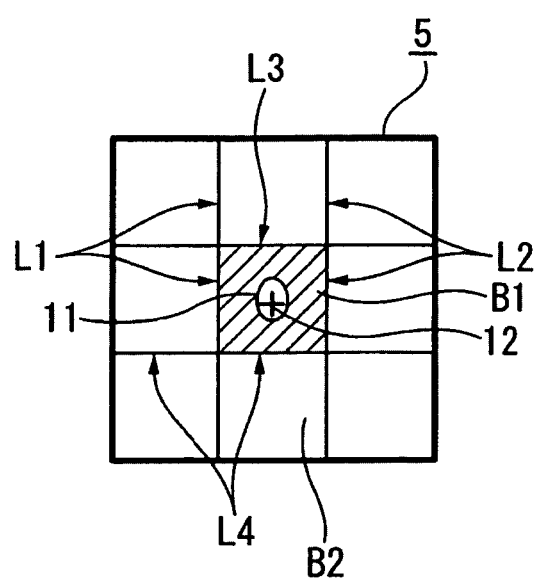
FIG. 6 is a diagram for explaining a change in the size of a virtual button caused in response to applied pressure.

As illustrated in FIG. 6, 9 buttons, three in the vertical direction and three in the horizontal direction, are provided on the operation surface 5 (the surface of the contact sensor unit 2) of the input device 1 in the same manner as described with reference to FIG. 5A, and respective virtual buttons correspond to regions, divided with the borderlines L1, L2, L3, and L4 in the vertical and horizontal directions, of the operation surface 5 of the input device 1.

In FIG. 6, further, the currently selected button B1 is illustrated with diagonal lines added. Also, a contact surface 11 of the operation surface 5 and a finger, and a finger position 12 (marked with a + mark) interpreted based upon contact detection with the contact sensor unit 2 are illustrated. The interpreted finger position 12 is obtained based on detection processing in the contact detection processing circuit 41 of the control unit 4 illustrated in FIG. 2.

The states of the virtual buttons illustrated in FIG. 6 may be the initial values of respective virtual buttons.

Figure 7A:
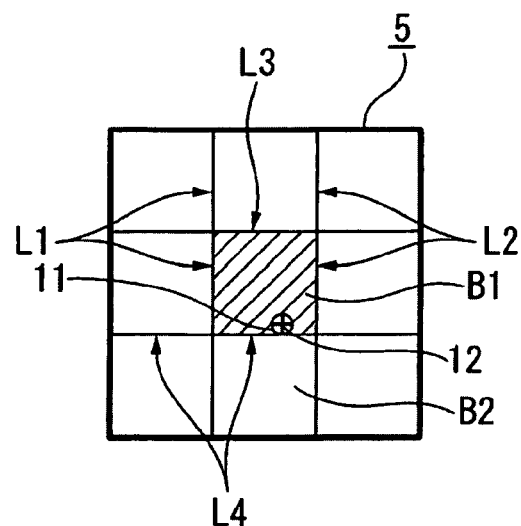
FIG. 7A, FIG. 7B, and FIG. 7C are another diagrams for explaining the change in the size of the virtual button caused in response to applied pressure.

Here, as illustrated in FIG. 7A, in the stage that the operation surface 5 of the input device 1 is touched with a finger without applying pressure, suppose a case that a right lower part of the virtual button B1 in the center (the same state as that in FIG. 1A) is touched with the finger.

At this time, because the contact position of the finger corresponds to the virtual button B1 in the center, this virtual button B1 is being selected. At this time, the contact surface 11 with the finger is relatively small, and both of the contact surface 11 and the interpreted finger position 12 are located within the virtual button B1 of the initial value (see FIG. 6).

Note that as illustrated in FIG. 7A, in the state that the finger merely touches the operation surface 5 and the pressure applied is relatively weak, by moving the finger over the operation surface 5, it is possible to change the virtual button to be selected and to scroll a display screen of a display device.

Figure 7B:
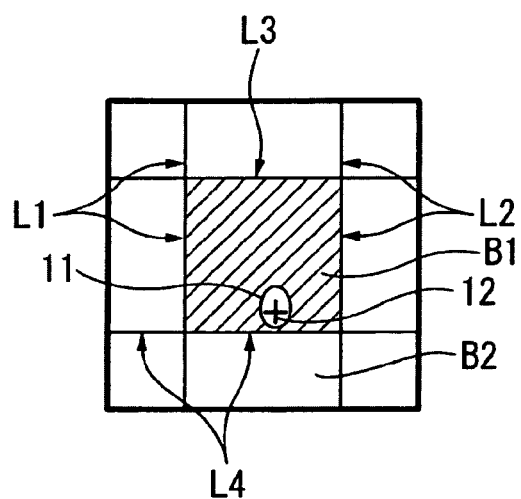

Next, when pressure is slightly applied with the finger, the selected virtual button B1 is enlarged according to the pressure. Specifically, as illustrated in FIG. 7B, by moving the borderlines L1, L2, L3, and L4 of the virtual button B1 in the horizontal and vertical directions, respectively, the virtual button B1 is expanded. Accordingly, as illustrated in FIG. 7B, even if the contact surface 11 with the finger is slightly expanded and the interpreted finger position 12 is slightly moved downwardly, either of the contact surface 11 with the finger and the interpreted finger position 12 is located within the virtual button B1. While the selected button B1 is expanded, virtual buttons around the selected button B1, such as a neighboring virtual button B2 below the virtual button B1, and the like, are reduced.

Figure 7C:
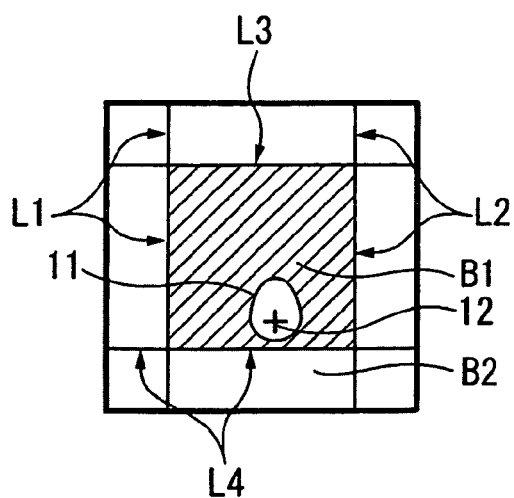

Next, when relatively strong pressure is applied with the finger, as illustrated in FIG. 7C, the contact surface 11 with the finger is further expanded, and the interpreted finger position 12 is also slightly moved further downwardly, however, because the selected virtual button B1 is greatly expanded in response to the pressure, both the contact surface 11 with the finger and the interpreted finger position 12 are located within the virtual button B1.

When the virtual button B1 is expanded as illustrated in FIG. 7B and FIG. 7C, processing for moving the borderlines L11, L12, L13, and L14 of the button 21 in the center of the button group 20 in FIG. 5B is carried out such that the size of the button 21 is expanded. In conjunction with this processing, the virtual button B1 in the center of the operation surface 5 of the input device 1 is also expanded. At this time, the processing is carried out based on the intensity of the pressure, detected with the pressure detection circuit 42, and the way set in advance, in which the size of the virtual button is changed in response to pressure.

Variety of modes can be conceivable for changing the size of a virtual button in response to pressure, some of which are described below.

Figure 8:
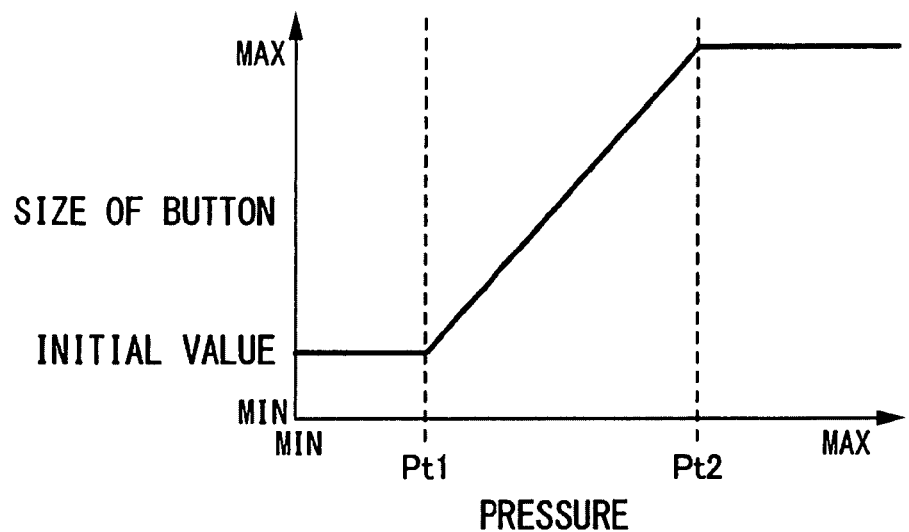
FIG. 8 is a diagram illustrating a mode of changing the size of a virtual button in response to applied pressure.

In the mode illustrated in FIG. 8, the intensity of pressure is divided into three regions, and in respective regions, how to change the size of a virtual button is set.

In the region where the pressure is smaller than a first threshold value Pt1, the size of the virtual button is the same as the initial value.

In the region where the pressure is in the range from the first threshold value Pt1 to a second threshold value Pt2, the size of the virtual button linearly changes in response to the change in the pressure.

In the region where the pressure is greater than the second threshold value Pt2, the size of the virtual button is constant at the maximum value (MAX).

By setting the change in the size of a virtual button as described above, the size of the virtual button does not change while the pressure is relatively small, changes if the pressure becomes equal to or greater than the first threshold value Pt1, and remains constant if the pressure becomes equal to or greater than the second threshold value Pt2. Note that the maximum value (MAX) of the size of the virtual button is made equal to the size of the whole surface of the operation surface 5 or smaller.

In the mode illustrated in FIG. 9, it is set such that the size of the virtual button changes in proportion to pressure.

As illustrated in FIG. 9, the size of the virtual button linearly changes from the initial value as the intensity of the pressure increases. When the pressure is at the maximum value (MAX), the size of the virtual button is also at the maximum value (MAX).

Note that instead of linearly changing the size of the virtual button as in the mode illustrated in FIG. 9, it is possible to change the size of the virtual button in steps in response to the change in the pressure.

Figure 10A:
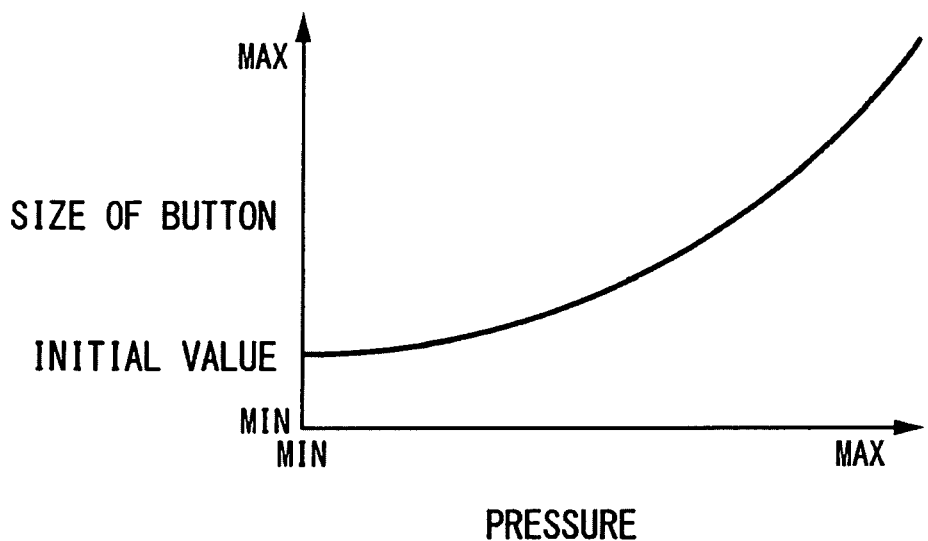
FIG. 10A and FIG. 10B are still another diagrams illustrating still another modes of changing the size of a virtual button in response to applied pressure.
Figure 10B:
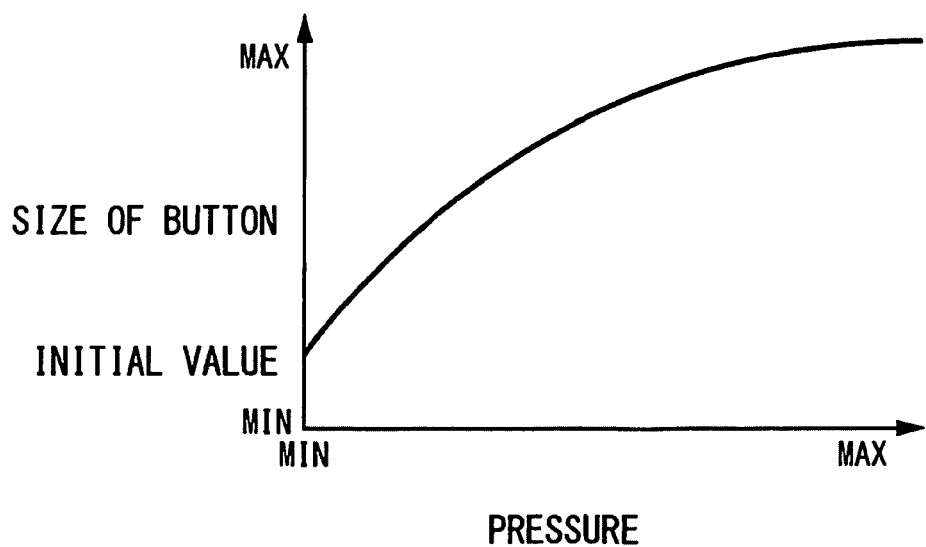

In respective modes illustrated in FIG. 10A and FIG. 10B, the size of a virtual button gradually changes in a curved line.

In the mode illustrated in FIG. 10A, the size of the virtual button changes in a downwardly convex curved line. In this case, the change in the size of the virtual button is relatively small while the pressure is relatively small, and the change ratio of the size of the virtual button gradually increases.

In the mode illustrated in FIG. 10B, the size of the virtual button changes in an upwardly convex curved line. In this case, although the change in the size of the virtual button is relatively large while the pressure is relatively small, the change ratio of the size of the virtual button gradually becomes small, and the size of the virtual button decreases and is saturated.

In the modes illustrated in FIG. 10A and FIG. 10B also, when the pressure is at the maximum value (MAX), the size of the virtual button is also at the maximum value (MAX).

Beside those illustrated modes, various other modes in changing the size of a virtual button may be achieved.

Note that what mode is the best depends on the configuration of the input device 1, such as sensitivities of the contact sensor and the pressure sensor, configuration of the operation surface (easiness of depressing, the surface conditions), and the like. An appropriate mode can be selected depending on the configuration of the input device 1.

Figure 11:
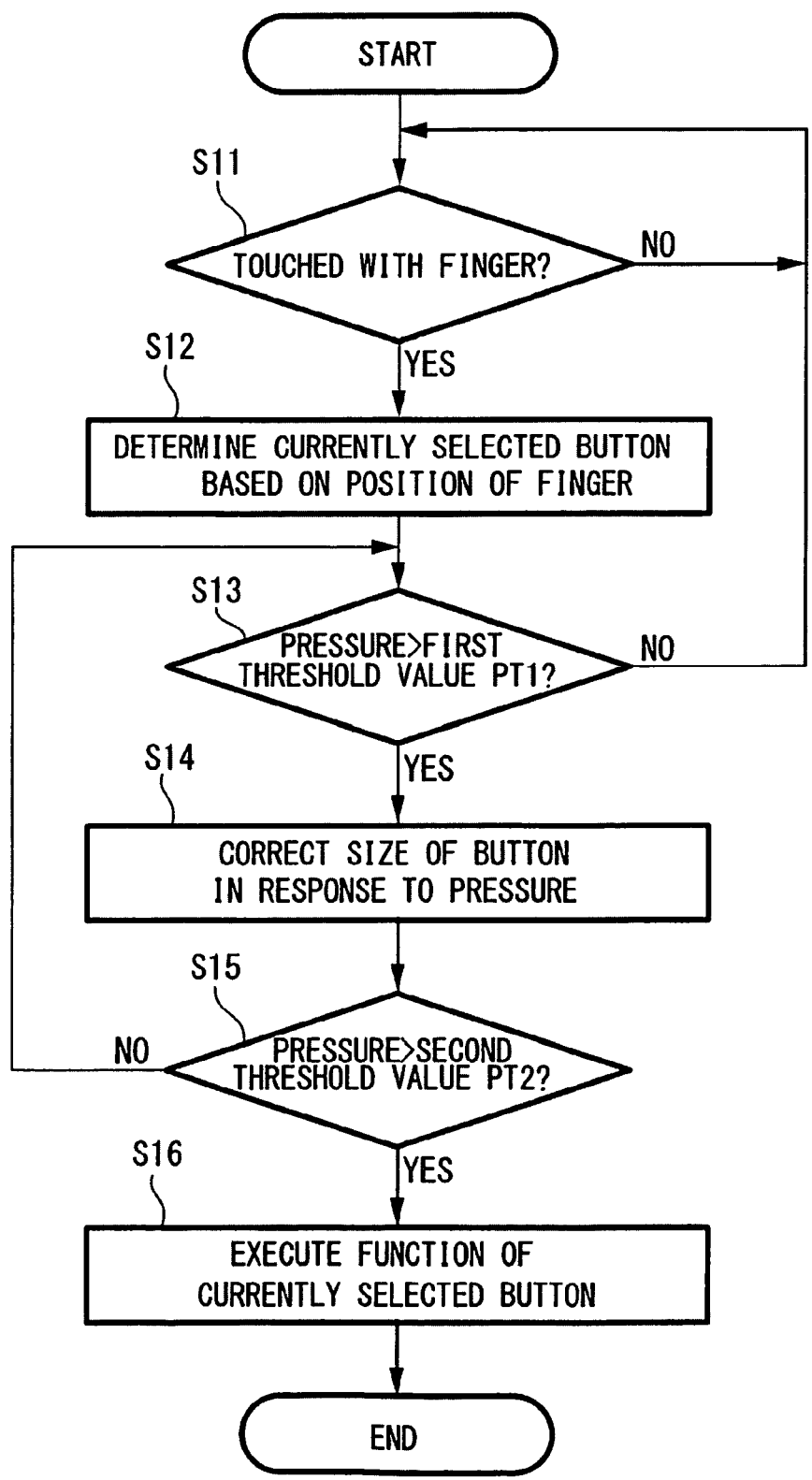
FIG. 11 is a flowchart for explaining a process of changing the size of a virtual button in response to applied pressure.

FIG. 11 is a flowchart for explaining a process of changing the size of a virtual button in response to pressure. The process illustrated in FIG. 11 handles the mode of changing the size of a virtual button illustrated in FIG. 8.

First, in step S11, it is judged whether the operation surface 5 (the surface of the contact sensor unit 2) is touched with a finger.

When the operation surface 5 is touched with the finger, the process proceeds to step 12, where a currently selected virtual button is determined based on the position of the finger. The position of the finger is obtained by detection processing in the contact detection processing circuit 41 of the control unit 4 in FIG. 2.

On the other hand, when the operation surface 5 is not touched with the finger, the process returns to the point before the step S11. That is, until a finger is touched with the operation surface 5, processing awaits while detecting the contact.

Next, the process proceeds from the step S12 to step S13, where it is judged if the pressure detected in the pressure sensor unit 3 is greater than the first threshold value Pt1.

When the detected pressure is greater than the first threshold value Pt1, the process proceeds to step S14, where the size of the currently selected virtual button is corrected in association with the pressure being applied. This correction process is executed in the second processing function unit 42 based on detection of the pressure detection circuit 42 in FIG. 2. At this time, the switching selection circuit 49 is switched to the terminal a.

On the other hand, when the detected pressure is smaller than the first threshold value Pt1, the process returns to the point before the step S11. That is, the sizes of the virtual buttons remain in the initial values, and processing awaits performing detection of contact.

Next, the process proceeds from the step S14 to step S15, where it is judged if the pressure detected in the pressure sensor unit 3 is greater than the second threshold value Pt2.

When the detected pressure is greater than the second threshold value Pt2, the process proceeds to step S16, where a function associated with the currently selected virtual button is executed in the third processing function unit 53 illustrated in FIG. 2. At this time, the switching selection circuit 43 is switched to the terminal b.

After processing of the step S16, the process ends.

On the other hand, when the detected pressure is smaller than the second threshold value Pt2, the process returns to the point before the step S13. That is, in the state that the currently selected button has been determined, processing awaits while performing pressure detection.

Note that in the step S13 of the flowchart in FIG. 11, instead of judging if the pressure detected in the pressure sensor unit 3 is greater than the first threshold value Pt1, whether or not pressure is being applied to the pressure sensor unit 3 may be judged.

When expanding the size of a virtual button from the initial value even when a relatively small depressing force is applied as in the modes of changing the size of a virtual button illustrated in FIG. 9, FIG. 10A and FIG. 10B, it may only be necessary to judge if pressure is being applied as described above. In such a case, if pressure greater than the pressure at a minimum value as the detection boundary of the pressure detection circuit 42 is applied, then the pressure is detected in the pressure detection circuit 42.

Further, in the step S15 of the flowchart in FIG. 11, it is possible to use the maximum value (MAX) of the pressure to be detected, instead of the second threshold value Pt2. When changing the size of a virtual button up to the maximum value of the pressure to be detected as in the modes of changing the size of a virtual button illustrated in FIG. 9, FIG. 10A and FIG. 10B, in the step S15, the maximum value (MAX) of the pressure to be detected is used instead of the second threshold value Pt2.

That is, when the pressure equal to or greater than predetermined pressure, such as the second threshold value Pt2 and the maximum value (MAX) of the pressure to be detected, has been detected, the size of a corresponding virtual button is expanded so as to be equal to the size of the operation surface 5, and then the process is only needed to proceed to the step where a function associated with the currently selected virtual button is executed. Note here that instead of expanding the size of the virtual button so as to be equal to the size of the operation surface 5, expanding the size of the virtual button may be stopped.

Figure 12:
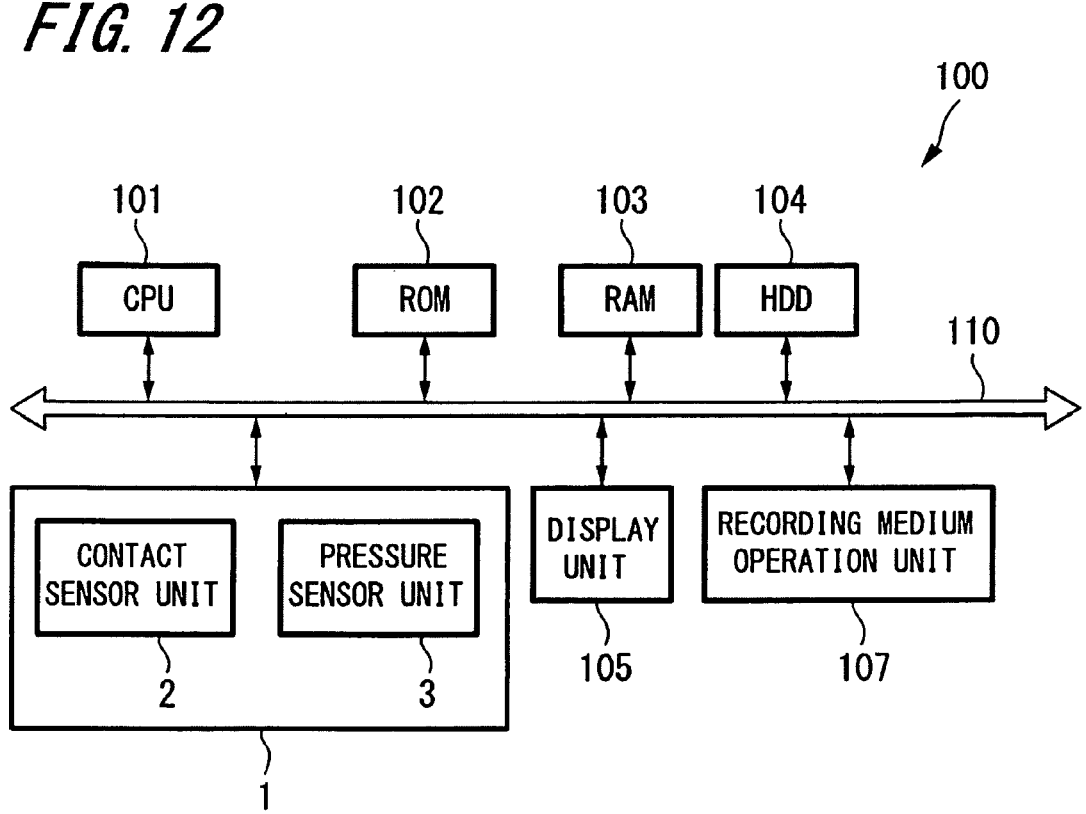
FIG. 12 is a block diagram of an information processing apparatus using the input device of FIG. 2 according to an embodiment of the invention.

FIG. 12 is a block diagram of an information processing apparatus 100 using the above-described input device 1, according to an embodiment of the invention.

In FIG. 12, a ROM 102 storing programs and data and a RAM 103 storing data in processing, and the like are connected with a bus 110 connected with a CPU 101, and the input device 1 is connected with the bus 110. The CPU 101 executes various kinds of processing according to the programs stored in the ROM 102 or programs loaded into the RAM 103. Data, and the like necessary for the CPU 101 to execute various types of processing are also stored in the RAM 103 as appropriate.

The input device 1 outputs a signal based on interpreting a pressure value detected in the pressure sensor unit 3, as described above in connection with FIG. 2. Here, the control unit 4 in FIG. 2 may be provided in the input device 1 or may be provided as an interface circuit for the bus 110, however, as necessary, a part or the whole part of the control unit 4 may be realized as software to be stored in the ROM 102 or RAM 103 and to be executed by the CPU 101.

Further, each of the first processing function unit 51, the second processing function unit 52, and the third processing function unit 53 illustrated in FIG. 2 may be realized as hardware in a not-shown configuration, or for example, as software to be executed by the CPU 101 of the information processing apparatus 100 illustrated in FIG. 12.

Furthermore, a hard disk device (HDD) 104, a display unit 105, a recording medium operation unit 107, which performs reproduction of and/or recording to a recording medium, such as an optical disk, a memory card, and the like, may optionally be connected with the bus 110 in FIG. 12.

In addition to the above, it is possible to add a communication circuit, a tuner circuit, and the like as necessary and to omit unnecessary circuits. Further, it is possible to configure this information processing apparatus 100 as a personal computer, a hard disk recorder, a television, and another electronic apparatus.

According to the above-described embodiment, when the pressure detected by the pressure detection circuit 42 of the input device 1 is equal to or greater than the first threshold value Pt1, a process of correcting the layout of the virtual buttons is performed in accordance with the intensity of the detected pressure such that the size of the selected virtual button B1 is expanded, and the virtual buttons are reset in the operation surface 5 in a corrected layout.

Accordingly, even if the contact surface 11 with a finger is expanded as the depressing force of the finger is increased, or the position of the contact surface 11 is deviated, the size of the virtual button being selected based on pressure is expanded and the layout of the virtual buttons is reset, and the contact surface 11 with the finger is still located within the selected virtual button B1. Therefore, it is prevented that a neighboring virtual button B2 is selected and unintended function is activated by the user.

Note that instead of carrying out calculation based on the virtual button group 20 as illustrated in FIG. 5B, control may be carried out such that the layout (sizes and borderlines) of the virtual buttons of the operation surface of the input device 1 is directly changed. Then, hardware such as an input device, a display device, and the like, control programs, and the like may be configured so as to handle calculation and control methods.

In FIG. 7A, FIG. 7B, and FIG. 7C, all of the borderlines L1, L2, L3, and L4 of the selected virtual button B1 are moved, however, only some of the borderlines may be moved.

Further, for example, it is possible to configure such that in the stage that a finger is in contact with and before pressure is applied to the operation surface 5 of the input device 1, the direction in which the position of the finger is deviated from the center of a virtual button is detected and the size of the virtual button is mainly expanded in the direction of the deviation.

Such a case is now described with reference to FIG. 13A, FIG. 13B, FIG. 14A, and FIG. 14B.

Figure 13A:
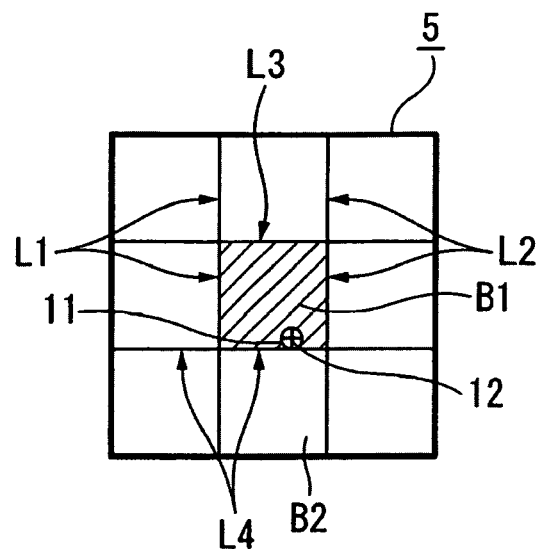
FIG. 13A and FIG. 13B are diagrams for explaining a configuration to detect a direction in which the finger position is deviated from the center of a virtual button and to expand the virtual button in that direction.
Figure 13B:
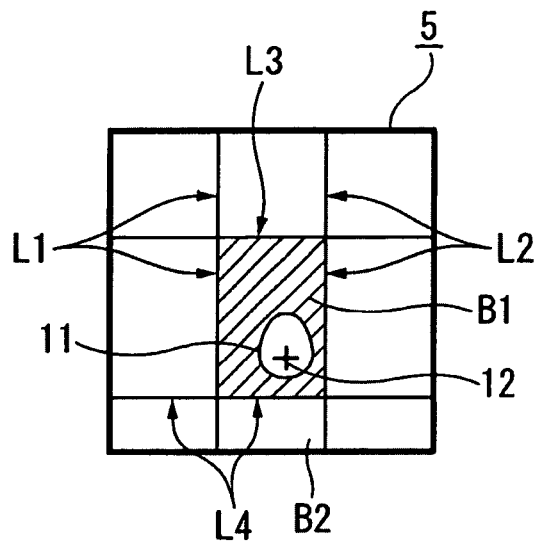

As illustrated in FIG. 13A, when the contact position of a finger is located below the center of the virtual button B1, in response to pressure, as illustrated in FIG. 13B, the borderline L4 at the lower side of the virtual button B1 is moved downwardly. The other borderlines L1, L2 and L3 remain in the same positions.

Figure 14A:
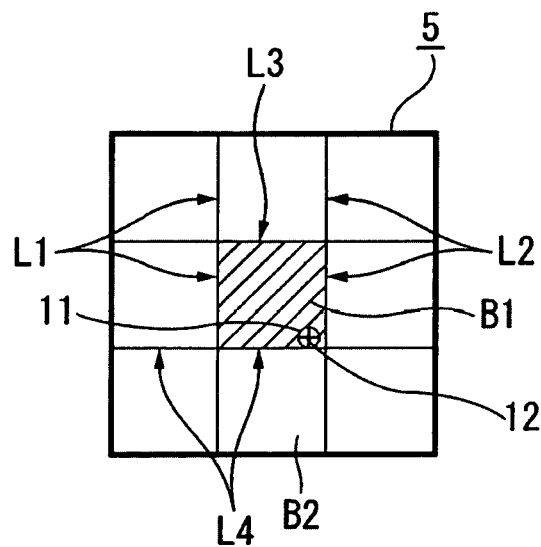
FIG. 14A and FIG. 14B are another diagrams for explaining another configuration to detect a direction in which the finger position is deviated from the center of a virtual button and to expand the virtual button in that direction.
Figure 14B:
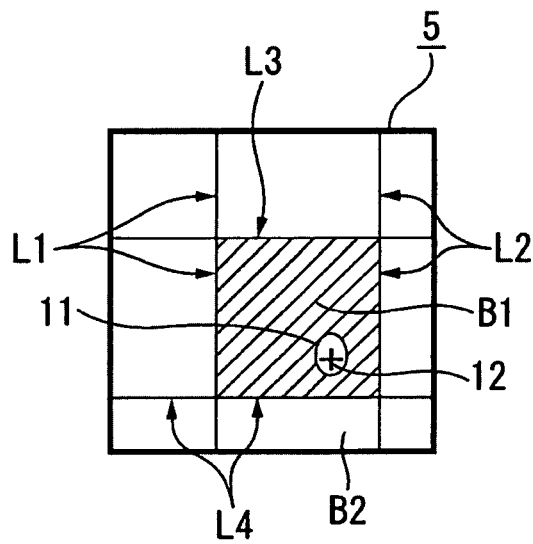

When the contact position of the finger is located to the lower right of the center of the virtual button B1 as illustrated in FIG. 14A, in response to pressure, as illustrated in FIG. 14B, the borderline L2 at the right side of the selected virtual button B1 is moved toward right and the borderline L4 at the lower side of the virtual button B1 is moved downwardly. The other borderlines L1 and L3 remain in the same positions.

In both of FIG. 13B and FIG. 14B, because of the expansion of the virtual button B1 being selected, the contact surface 11 is located within the virtual button B1.

With the configuration as described above, processing becomes complicated a little as compared with the case illustrated in FIG. 7, however, in the configuration illustrated in the block diagram of FIG. 2, processing can be executed by only changing concrete calculation, and the like of the processing.

Note that the configuration of the input device used in the invention is not limited to the configuration in the above-described embodiment. For example, the input device may be configured such that a plate-like contact sensor unit is supported at four corners by spacers, and the like and for example strain gauges are stuck to the rear surface of the contact sensor unit to constitute a pressure sensor unit, and a strain in the plate-like contact sensor unit when the contact sensor unit is depressed with a finger, and the like is detected with the strain gauges, and the like and thereby pressure is detected.

Further, the input device may be configured for example such that a pressure sensor unit is provided to the rear surface of a contact sensor unit and pressure to the contact sensor unit is applied to the pressure sensor unit.

It should be further noted that although in the input device 1 according to the above-described embodiment, the sensor contact unit 2 is configured to detect contact of a finger with the operation surface 5, a detection unit according to an embodiment of the invention is only needed to have the function of detecting at least access or contact of a finger to or with the operation surface. For the detection unit for detecting access of a finger, for example, a proximity sensor using a transmitting electrode and a receiving electrode, described in the above-described JP No. 2003-223265, may be used.

In the above-described embodiment, description has been made with respect to the configuration that the input device 1 and the display device (display unit 105) are separate, however, like a touch panel, a display device combining an input device may be configured, and the invention can be also applied to such a display device.

In the touch panel, for example, a translucent plate-like member or a translucent film may be arranged as the operation surface on the surface of a display screen to detect contact with a finger, and the like.

In this case, for example, it is possible to configure such that a translucent material is disposed on a display surface of the contact sensor unit 2 illustrated in FIG. 2 and pressure to the translucent contact sensor unit 2 is detected with the pressure sensor unit 3.

Further, a touch panel serving as the contact sensor unit is attached to the surface of a plate-like display member such as an LCD panel, a pressure sensor is arranged to the rear surface of the plate-like display member, and the depressing force applied from the touch panel to the pressure sensor unit through the plate-like display member is detected by the pressure sensor.

Note that it is also possible to display the softbutton on the display screen of the display device with the size thereof enlarged as the virtual button is enlarged.

Similarly, when an input device and a display device are combined like a touch panel, and the like, it is also possible to display the softbutton, on which the user is touched with his/her finger, with the size thereof enlarged as the virtual button is enlarged.

In the above-described configurations, it is only necessary to carry out signal processing for displaying in a screen such that not only the size of the virtual button is enlarged according to pressure of a finger, but also the size of the button of the display unit is enlarged.

In this respect, however, if the size of the softbutton of the display unit is also changed, there may be a case that the user is surprised or disturbed. Also, because it is necessary to reduce or delete surrounding softbuttons, image processing is to be increased, such as reducing or deleting icons and characters on the softbuttons.

In the invention, the shape of the virtual button is not limited to the lattice-like shape (a quadrangle) described in the above-described embodiment, and may be a circle, a triangle, or another shape.

Also, the function executed by one virtual button is not limited to one function, and for example, a plurality of functions may be switched.

In a case that the display screen includes an assemblage of softbuttons and functions executed by respective softbuttons are displayed in the forms of icons and characters, it is possible to configure such that a plurality of display screens are switched. Further, the contents (functions to be executed) and the sizes and shapes of softbuttons can be changed in respective display screens.

Next, an exemplary configuration to switch a plurality of display screens is described.

Figure 15A:
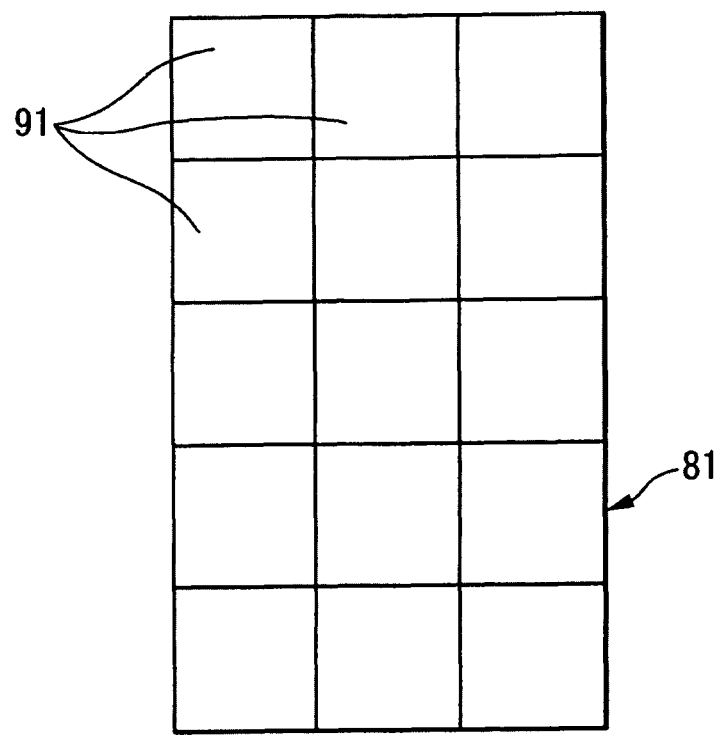
FIG. 15A and FIG. 15B are diagrams for explaining a configuration to switch a plurality of display screens.
Figure 15B:
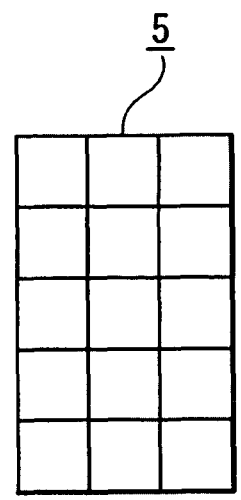
Figure 16A:
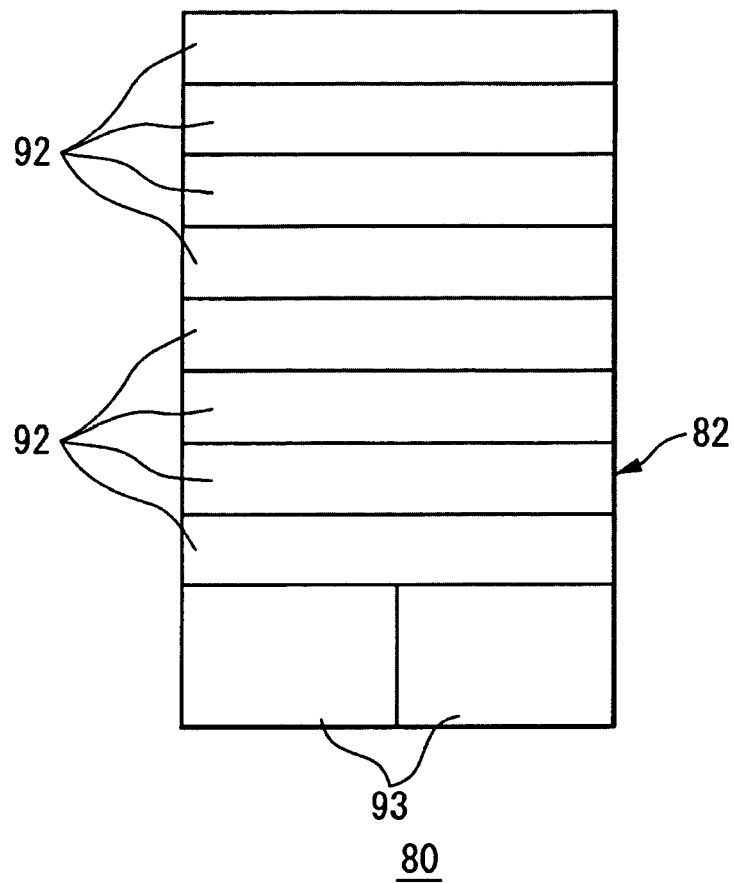
FIG. 16A and FIG. 16B are another diagrams for explaining another configuration to switch a plurality of display screens.
Figure 16B:
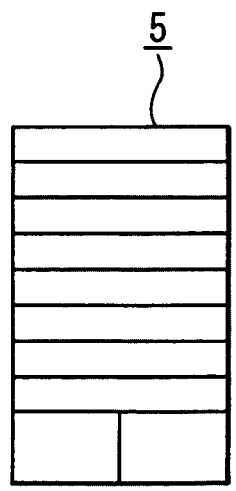

FIG. 15A and FIG. 15B, and FIG. 16A and FIG. 16B illustrate display screens and virtual buttons, respectively, when a plurality of display screen are switched. FIG. 15A and FIG. 16A illustrate the display screens, and FIG. 15B and FIG. 16B illustrate the virtual buttons.

In a display unit 80, a first display screen 81 illustrated in FIG. 15A and a second display screen 82 illustrated in FIG. 16A are switched to be displayed.

In the first display screen 81 illustrated in FIG. 15A, 15 softbuttons 91 each having approximately square shape are arranged, 5 in the vertical direction and 5 in the horizontal direction. Although not shown, a display representing a function, such as a character, an icon, a symbol, and the like, is provided in each softbutton.

In a manner corresponding to these softbuttons 91 of the first display screen 81, as illustrated in FIG. 15B, virtual buttons in the shapes similar to those of the softbuttons 91 (approximately square) are provided in the operation surface 5 of the input device 1.

In the second display screen 82 illustrated in FIG. 16A, 8 softbuttons 92 each having a laterally thin and long rectangular shape are arranged, and below them, 2 rectangular softbuttons 93 slightly laterally elongated and having a borderline in the center thereof are arranged. In the thin and long rectangular softbuttons 92, although not shown, displays representing functions are provided by characters, and the like. In the slightly laterally elongated rectangular softbuttons 93, although not shown, displays representing functions are provided, such as characters, icons, symbols, and the like. For example, various functions can be assigned to the softbuttons 92, and the display screen switching function, and the like are assigned to the softbuttons 93.

In a manner corresponding to the softbuttons 92 and 93 of the second display screen 82, as illustrated in FIG. 16B, virtual buttons in the shapes similar to those of the softbuttons 92 and 93 (rectangle) are provided in the operation surface 5 of the input device 1.

That is, correspondingly to the softbuttons 91, 92 and 93 of the respective display screens 81 and 82, virtual buttons are provided in the operation surface 5.

A change in the shape of a virtual button can be easily made by carrying out processing in the control unit of FIG. 2 or the CPU 101 of FIG. 12 in response to switching of the display screens 81 and 82 and thereby changing the positions of the borderlines of the virtual button.

At this time, calculation may be carried out based on the virtual button group 20 illustrated in FIG. 5B or control may be carried out such that the layout (the sizes and the borderlines) of the virtual buttons is directly changed. Then, hardware and software are configured so as to handle calculation and control methods.

Then, in respective virtual buttons illustrated in FIG. 15B and FIG. 16B, in the same manner as described with reference to FIG. 7A, FIG. 7B, FIG. 7C, FIG. 13A, FIG. 13B, FIG. 14A, and FIG. 14B, in response to pressure of depressing the operation surface 5 with a finger, the size of a selected virtual button and the positions of borderlines thereof are changed.

Accordingly, a function can be executed without an error in either of the display screens 81 and 82.

Note that in this configuration also, by moving a finger on the operation surface 5 in the state that the finger only touches the operation surface 5 and pressure thereto is relatively weak, it is possible to change a softbutton to be selected and to scroll a display screen, in each of the display screens 81 and 82.

In the above-described embodiments, processing is mainly realized by hardware, however, the invention is not limited thereto, and it is possible to realize arbitrary processing by causing a CPU to execute a computer program. In this case, it is possible to provide the computer program recorded in a recording medium, and it is also possible to provide the computer program through the Internet and other transmission media.

In the invention, an information processing apparatus may be provided with a virtual button control unit configured to correct the layout of virtual buttons such that the size of a virtual button is enlarged, or the information processing apparatus may be configured such that by causing the CPU to execute a computer program, a procedure to correct the layout of virtual buttons such that the size of a virtual button is enlarged is carried out.

That is, the invention carries out, using hardware or software, a virtual button control process to correct the layout of virtual buttons such that the size of a virtual button is enlarged.

Correction of the size of a virtual button in the invention may or may not reflect a GUI (Graphical User Interface) environment.

In the invention, because processing to correct the size of a virtual button is carried out with a virtual button control unit, and the like, it is possible to apply the invention also, for example, to the input device described in the above-described JP No. 2003-223265 in which a pressure sensor is provided to physical buttons and the buttons are arranged in the vertical and horizontal directions.

When applying the invention to such an input device, the sizes and the positions of the virtual buttons can be changed independently of the physical buttons.

Even in such an input device, by applying the invention, it becomes possible to control such that when a depressing force is applied to a physical button, even if the contact position of a finger is caused to deviate and a neighboring physical button is depressed together, or the finger is moved to a neighboring physical button, the size of a virtual button is corrected so as to be larger than the sizes of individual physical buttons and thereby a function associated with the physical button originally in contact with the finger is executed.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an operation input unit including an operation surface having virtual buttons that are variably set thereto;
a position detection unit configured to detect whether a user touches the operation surface of the operation input unit, and to detect a position at which the user touches the operation surface of the operation input unit;
a pressure detection unit configured to detect pressure applied by the user touching the operation surface of the operation input unit; and
a virtual button control unit configured to interpret, when the position detection unit has detected the position at which the user touches the operation surface of the operation input unit, a virtual button corresponding to the detected position as a selected virtual button, and to correct, when the pressure detected by the pressure detection unit is equal to or greater than a first threshold value, a layout of the virtual buttons such that a size of the selected virtual button is enlarged according to intensity of the detected pressure,
wherein the position detection unit is further configured to detect a direction in which the position at which the user touches the operation surface is deviated from a center of the virtual button and the virtual button control unit is further configured to expand the size of the selected virtual button in the detected direction of deviation.

2. The information processing apparatus according to claim 1, wherein
pressure of the first threshold value is pressure of a minimum value that can be detected by the pressure detection unit.

3. The information processing apparatus according to claim 1, wherein
the virtual button control unit is configured, when the pressure detected by the pressure detection unit is equal to or greater than a second threshold value, to correct the layout of the virtual buttons such that the size of the selected virtual button is enlarged so as to be equal to a size of the operation surface and to execute a function corresponding to the selected virtual button.

4. The information processing apparatus according to claim 1, further comprising
a display unit configured to display function information on one or more functions assigned to the operation surface, wherein
softbuttons corresponding to the virtual buttons are displayed on the display unit.

5. An information processing method variably setting virtual buttons to an operation surface and operating the virtual buttons, comprising the steps of:
detecting whether a user touches the operation surface of the operation input unit;

detecting a position at which the user touches the operation surface of the operation input unit;

detecting pressure applied by the user touching the operation surface of the operation input unit;

interpreting, when the user touches the operation surface of the operation input unit in the position detecting step, a virtual button corresponding to the detected position as a selected virtual button, and correcting, when the pressure applied by the user touching the operation surface of the operation input unit in the pressure detecting step is equal to or greater than a first threshold value, a layout of the virtual buttons such that a size of the selected virtual button is enlarged according to intensity of the detected pressure;

detecting a direction in which the position at which the user touches the operation surface is deviated from a center of the virtual button; and expanding the size of the selected virtual button in the detected direction of deviation.

6. The information processing method according to claim 5, wherein
pressure of the first threshold value is pressure of a minimum value that can be detected in the pressure detection step.

7. The information processing method according to claim 5, wherein
in the interpreting/correcting step, when the detected pressure is equal to or greater than a second threshold value, the layout of the virtual buttons is corrected such that the size of the selected virtual button is enlarged so as to be equal to a size of the operation surface and a function corresponding to the selected virtual button is executed.

8. The information processing method according to claim 5, further comprising a step of displaying softbuttons corresponding to the virtual buttons on a display screen of a display device.

9. The information processing method according to claim 8, wherein
in the display device, when a plurality of screens, to which layouts of the softbuttons are set, respectively, are switched to be displayed and a layout of the softbuttons is changed by switching the screens, the layout of the virtual buttons is changed in compliance with the layout of the softbuttons.

10. A computer program installed on a computer to execute processing to an input device provided with an operation surface, a position detection unit detecting whether the user touches the operation surface of the operation input unit and detecting a position at which the user touches the operation surface of the operation input unit with a finger, and a pressure applied by the user touching the operation surface of the operation input unit, the processing comprising the steps of:

setting virtual buttons to the operation surface in a predetermined layout;

interpreting, when the position detection unit detects whether the user touches the operation surface of the operation input unit, a virtual button corresponding to the position at which the user touches the operation surface of the operation input unit in the position detection unit as a selected virtual button;

correcting, when pressure is detected in the pressure detection unit and the detected pressure is equal to or greater than a first threshold value, the layout of the virtual buttons such that a size of the selected virtual button is enlarged according to intensity of the detected pressure;

detecting a direction in which the position at which the user touches the operation surface is deviated from a center of the virtual button; and expanding the size of the selected virtual button in the detected direction of deviation; and setting the virtual buttons to the operation surface according to the corrected layout.

* * * * *